United States Patent Office 2,727,913
Patented Dec. 20, 1955

2,727,913

METHOD OF OBTAINING CONCENTRATED MONOGLYCERIDES

Noel H. Kuhrt and Eileen A. Welch, Rochester, N. Y., assignors to Eastman Kodak Company, Rochester, N. Y., a corporation of New Jersey No Drawing. Application October 11, 1952, Serial No. 314,412

7 Claims. (Cl. 260—410.7)

This invention relates to the preparation of concentrated monoglyceride products and is particularly concerned with methods of concentrating monoglycerides by solvent extraction.

Monoglycerides are usually made by reacting a fatty material such as a fatty acid or fatty triglyceride with excess glycerine to form a product containing from about 35% to about 60% by weight of monoglyceride in admixture with substantial amounts of diglyceride and unreacted fatty material. Because of the enhanced activity of the monoglyceride over the diglyceride and fatty material, it is desirable to concentrate the monoglyceride portion to obtain a product containing at least 80% by weight of monoglyceride and desirably in excess of 90% by weight of monoglyceride.

It is accordingly an object of this invention to provide a new and highly effective method for concentrating monoglycerides from mixtures with other fatty materials such as diglycerides, triglycerides, fatty acids or the like.

It is a further object of this invention to provide a solvent extraction process which effectively results in the production of products containing at least 80% by weight of monoglycerides.

Another object of the invention is to provide a new method for obtaining purified or concentrated monoglycerides from fatty materials such as fatty triglycerides, fat-forming fatty acids or other suitable fatty material.

Another object of the invention is to provide a simple but effective method of preparing high potency monoglycerides free of objectionable amounts of glycerine, phospholipids, diglycerides, and unreacted fatty material.

Other objects will be apparent from the description and claims which follow.

These and other objects are attained by means of this invention as described more fully hereinafter.

The monoglyceride-containing mixtures which are concentrated by means of this invention can be prepared by any suitable process whereby fatty material is converted to monoglyceride. In the preferred method, a fatty material such as a fatty triglyceride or a fat-forming fatty acid is reacted with glycerine, desirably in the presence of a transesterification catalyst, under conditions effective to produce a reaction product containing a substantial amount of monoglyceride. Any of the well-known fatty materials can be employed including both solid fats and fatty oils, whether natural or synthetic, and including fatty triglycerides and fat-forming fatty acids. The fatty materials desirably employed include the animal fats and vegetable oils, whether hydrogenated or unhydrogenated, and the fat-forming fatty acids which preferably are those fatty acids having from eight to twenty-four carbon atoms and desirably twelve to twenty carbon atoms. Examples of suitable fatty materials include cottonseed oil, lard, peanut oil, butterfat, oleic acid, stearic acid, corn oil, coconut oil, palmitic acid, tallow, soybean oil, myristic acid and other well-known fatty materials or mixtures thereof.

Such fatty materials are reacted with a quantity of glycerine which is preferably in excess over stoichiometric amounts and desirably amounts to at least 140% of molar equivalency in accordance with well-known alcoholysis practice. The formation of monoglycerides is promoted by the presence in the reaction mixture of a transesterification catalyst, any of the well-known catalysts being suitable and the basic transesterification catalysts being preferred. Thus, for example, the monovalent metal hydrides and hydroxides such as sodium hydroxide, potassium hydroxide, sodium hydride or the like can be used, or the bivalent metal oxides or hydroxides can be used including calcium oxide, calcium hydroxide, strontium oxide, strontium hydroxide and the like. These materials appear to function as metal soaps formed in the reaction mixture but soaps can be formed prior to the reaction and added as catalyst. Other suitable catalytic materials include the alkali metal glyceroxides such as sodium glyceroxide, and acids such as the mineral acids or ionizable organic acids, as well as such diverse transesterification catalysts as sodium metal, aluminum chloride and the like.

The time and temperature of reaction will vary, of course, depending upon the kind and proportions of reactants employed, kind and concentration of catalysts, and similar variable conditions but the reaction is desirably effected in accordance with usual alcoholysis practice with temperatures as low as room temperature being suitable with the alkali metal hydride catalysts and temperatures up to 180° C. being desirably employed with the glyceroxide catalysts and from 180° to 280° C. with the catalysts functioning as metal soaps. Similarly, the time of reaction will vary from about 15 minutes to as long as two hours or longer in some cases.

The reaction product initially obtained ordinarily contains from about 35% to about 60% by weight of monoglycerides admixed with unreacted glycerine and fatty material as well as a substantial proportion of diglycerides. When unrefined natural fats are employed, the reaction product may also contain some phospholipids.

In the preferred process embodying this invention, the unreacted glycerine is first separated from the reaction product by phase separation and decantation, distillation, washing, or other suitable separating method. Separation of the major portion of the glycerine is desirably accomplished by cooling the reaction mixture to a temperature below about 100° C. and allowing the glycerine to separate into a layer which can be drawn off from the reaction mixture, separation times of from about 15 minutes to about 2 hours being preferred for optimum results. The remaining unreacted glycerine can be removed in accordance with this invention by dissolving the reaction product in a relatively non-polar solvent such as ethyl ether and washing out the glycerine with water, such washing being effective to remove substantially all of the unreacted glycerine whether or not phase separation is employed in conjunction with the washing.

The resulting glycerine-depleted product is then concentrated in accordance with this invention after removal of the non-polar solvent. When the reaction product contains an objectionably large amount of phospholipids, the glycerine-depleted product is desirably dissolved in acetone whereupon the phospholipids precipitate and are filtered off.

After removal of the acetone, the reaction product is extracted with methyl alcohol containing not more than about 10% by weight of water. The methyl alcohol extraction is effected in accordance with well-known extraction practice, either batchwise or in a continuous countercurrent extraction column or by other well-known means. The alcohol-insoluble portion can be recovered and recycled for additional processing if desired, and the alcohol-soluble fraction, which contains substantially all of the monoglycerides admixed with diglycerides, is further extracted with methyl alcohol containing from about 30% to about 60% by weight of water whereupon the monoglycerides are taken up in the aqueous alcohol in more than 80% and usually more than 90% purity. The extraction with the aqueous methanol containing from about 30% to about 60% water likewise can be effected in accordance with well-known extraction practice, and either by recovering the soluble fraction from the methanol containing not more than about 10% water and then extracting the recovered fraction with aqueous methanol or by diluting the methanol with additional water whereby the non-monoglycerides are precipitated out and separated by centrifuging, filtration, phase separation or the like.

Best results are obtained by stabilizing the reaction product during the solvent extractions with a stabilizing amount of any of the well-known fat antioxidants such as hydroquinone, butylated hydroxy anisole or the like. The product obtained as the extract with the aqueous methanol consists predominantly of monoglycerides having admixed therewith only minor amounts of diglycerides and other fatty material, and the product usually has a monoglyceride content in excess of 90% by weight.

Usually, the monoglyceride reaction product, especially when prepared from an animal fat or vegetable oil, contains a mixture of monoglycerides of both the saturated and unsaturated fatty acids. In most cases, the product desirably contains a mixture of monoglycerides generally corresponding to the triglycerides in the original fatty material. In some cases, however, it is desirable to obtain only saturated monoglycerides or only unsaturated monoglycerides as product. We have further found that the saturated monoglycerides such as the monopalmitates, monostearates and the like are insoluble in petroleum ether and that the extract with either the methanol containing not more than 10% water or the aqueous methanol containing from about 30% to about 60% water can be dissolved in petroleum ether and the solution cooled whereby the saturated monoglycerides are crystallized out.

The process embodying the invention is illustrated by the preparation of lard monoglycerides in a concentration of more than 90% by weight, it being understood that monoglyceride concentrates of any of the other animal fats, vegetable oils or fatty acids can be prepared in similar fashion by means of this invention. In a typical process, 85 grams of prime steam rendered lard, 30 grams of glycerine and 0.1 gram of sodium hydroxide were mixed together and heated at 180° C. for two hours. The reaction mixture was then dissolved in one liter of ethyl ether, the resulting ethereal solution was washed four times with water, dried over sodium sulfate and the ether removed by evaporation under nitrogen. A portion, weighing 66 grams, of the ether-soluble fraction was dissolved in 800 ml. of acetone and 3 grams of acetone-insoluble phospholipids were removed by filtration. The acetone-soluble fraction was recovered by evaporating the acetone under vacuum to obtain a reaction product weighing 63 grams and containing 32.6% monoglycerides by weight.

The resulting glycerine-depleted reaction product from which the phospholipids had been removed was then extracted twice with warm 95% aqueous methanol and the alcohol-insoluble triglyceride fraction was separated out. The alcohol solution was then diluted with water to 70% aqueous methanol whereupon the monoglycerides concentrated in the aqueous alcohol. The alcohol phase was separated from the insoluble phase consisting largely of diglycerides and free fatty acids, and the alcohol removed by evaporation to give approximately 19 grams of lard monoglycerides in a purity of about 98%.

Similar results are obtained by concentrating the naturally-occurring monoglycerides in lard in accordance with this invention, as well as by processing reaction products obtained by alcoholysis of cottonseed oil and similar vegetable oils, butterfat and similar animal fats, and fatty acids such as oleic acid and stearic acid with glycerine.

The invention thus provides a simple but highly effective method of concentrating monoglycerides from fatty mixtures containing such monoglycerides in lower concentration.

Although the invention has been described in considerable detail with reference to a preferred embodiment thereof, it will be understood that variations and modifications can be effected without departing from the spirit and scope of the invention as described hereinabove and as defined in the appended claims.

We claim:

1. The method of making a concentrated monoglyceride product which comprises extracting a material comprising monoglyceride in admixture with other fatty material including a substantial amount of diglyceride with methyl alcohol containing not more than about 10% water, and further extracting the resulting extract with methyl alcohol containing from about 30% to about 60% water and thereby obtaining a product consisting predominantly of monoglyceride.

2. The method which comprises reacting a triglyceride fat with glycerine under conditions effective to form a reaction product containing a substantial proportion of monoglyceride, separating unreacted glycerine from said reaction product, extracting the resulting glycerine-depleted reaction product with methyl alcohol containing not more than about 10% water, and thereafter extracting the alcohol-soluble fraction with methyl alcohol containing from about 30% to about 60% water to obtain an extract consisting predominantly of monoglyceride.

3. The method which comprises reacting a triglyceride fat with glycerine in the presence of a transesterification catalyst, dissolving the resulting reaction product in a non-polar solvent, washing out unreacted glycerine from the resulting solution with water, extracting the resulting washed reaction product with methyl alcohol containing not more than about 10% water; and extracting the alcohol-soluble fraction thereby obtained with methyl alcohol containing from about 30% to about 60% water and thereby obtaining an extract consisting predominantly of monoglyceride.

4. The method which comprises reacting a fatty material selected from the class consisting of animal fats and vegetable oils with an excess of glycerine in the presence of a basic transesterification catalyst and thereby forming a reaction product containing a substantial amount of monoglyceride, separating out at least a portion of the unreacted glycerine from said reaction product by phase separation, separating out a substantial portion of the remaining glycerine by washing said reaction product in solution in a non-polar solvent with water, extracting the resulting glycerine-depleted reaction product with methyl alcohol containing not more than about 10% water, and further extracting the resulting extract with methyl alcohole containing from about 30% to about 60% water and thereby obtaining an extract consisting predominantly of monoglyceride.

5. The method which comprises reacting a triglyceride fat with glycerine to form a reaction product containing a substantial amount of monoglyceride, precipitating excess phospholipids out of said reaction product with acetone, separating glycerine from said reaction product, extracting said reaction product with methyl alcohol containing not more than about 10% water, and dissolving monoglycerides out of the resulting extract with methyl alcohol containing from about 30% to about 60% water.

6. The process which comprises reacting a fatty material selected from the class consisting of animal fats and vegetable oils with excess glycerine in the presence of a basic transesterification catalyst and thereby forming a reaction product containing a substantial amount of monoglyceride, separating unreacted glycerine from the resulting reaction product and thereby obtaining a glycerine-depleted product comprising monoglyceride in admixture with substantial amounts of diglyceride and triglyceride, concentrating the monoglyceride from said glycerine depleted product by extraction with methyl alcohol containing not more than about 10% water followed by extraction of the alcohol-soluble material with methyl alcohol containing from about 30% to about 60% water, and recovering a product consisting predominantly of monoglyceride from said aqueous alcohol.

7. The process which comprises reacting a fatty material of the class consisting of animal fats and vegetable oils with excess glycerine in the presence of a basic transesterification catalyst and thereby forming a reaction product containing a substantial amount of monoglyceride, separating unreacted glycerine and phospholipids from said reaction product, said separating of unreacted glycerine including dissolving said reaction product in a non-polar solvent and washing out unreacted glycerine with water, said separating of phospholipids being effected by precipitation of said phospholipids out of said reaction product by the addition of acetone thereto, concentrating monoglycerides from the resulting product depleted in glycerine and phospholipids by extraction of the product with methyl alcohol containing not more than about 10% water and extraction of the alcohol-soluble product thereby obtained with methyl alcohol containing from about 30% to about 60% water, and removing the aqueous alcohol from the resulting alcohol extract and thereby recovering a product consisting predominantly of monoglycerides.

References Cited in the file of this patent

UNITED STATES PATENTS 2,553,288   Young et al. _____ May 15, 1951